US007935459B2

(12) United States Patent
Gaylord et al.

(10) Patent No.: US 7,935,459 B2
(45) Date of Patent: May 3, 2011

(54) PHOTO-MASKS AND METHODS OF FABRICATING SURFACE-RELIEF GRATING DIFFRACTIVE DEVICES

(75) Inventors: Thomas K. Gaylord, Atlanta, GA (US); Justin L. Stay, Suwanee, GA (US); Jonathan S. Maikisch, Atlanta, GA (US); James D. Meindl, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 692 days.

(21) Appl. No.: 11/767,372

(22) Filed: Jun. 22, 2007

(65) Prior Publication Data

US 2008/0003528 A1 Jan. 3, 2008

Related U.S. Application Data

(60) Provisional application No. 60/816,278, filed on Jun. 22, 2006.

(51) Int. Cl.
*G03F 1/00* (2006.01)
*G02B 5/18* (2006.01)

(52) U.S. Cl. ............................................. 430/5; 359/566
(58) Field of Classification Search .................. 430/5, 22, 430/311, 322; 359/565–569; 355/53; 385/14, 385/37
See application file for complete search history.

(56) References Cited

U.S. PATENT DOCUMENTS

| 4,806,442 | A  | * | 2/1989 | Shirasaki et al. | 430/4 |
| 6,200,711 | B1 | * | 3/2001 | Kurihara et al. | 430/5 |
| 6,249,335 | B1 | * | 6/2001 | Hirukawa et al. | 355/53 |
| 6,285,813 | B1 |   | 9/2001 | Schultz et al. | |
| 6,606,432 | B2 |   | 8/2003 | Gaylord et al. | |
| 7,459,242 | B2 | * | 12/2008 | Zait et al. | 430/5 |
| 2006/0228635 | A1 | * | 10/2006 | Suleski | 430/5 |
| 2008/0174754 | A1 | * | 7/2008 | Gaylord et al. | 355/53 |
| 2008/0212921 | A1 |   | 9/2008 | Gaylord et al. | |
| 2009/0098468 | A1 | * | 4/2009 | Gaylord et al. | 430/5 |

OTHER PUBLICATIONS

Cai, L.Z. et al., "Formation of a Microfiber Bundle by Interference of Three Noncoplanar Beams", Optics Letters, vol. 26, No. 23, Dec. 1, 2001, pp. 1858-1860.
Cai, L.Z. et al., "All Fourteen Bravais Lattices Can Be Formed by Interference of Four Noncoplanar Beams", Optics Letters, vol. 27, No. 11, Jun. 1, 2002, pp. 900-902.
Cai, L.Z. et al, "Formation of Three-Dimensional Periodic Microstructures by Interference of Four Noncoplanar Beams", Optical Society of America, vol. 19, No. 11, Nov. 2002, pp. 2238-2244.
Caloz, Christophe et al., "Metamaterials for High-Frequency Electronics", Proceedings of the IEEE, vol. 93, No. 10, Oct. 2005, pp. 1744-1752.

(Continued)

*Primary Examiner* — Stephen Rosasco
*Assistant Examiner* — Stewart A Fraser
(74) *Attorney, Agent, or Firm* — Ryan A. Schneider, Esq.; Dean Y. Shahriari; Troutman Sanders LLP

(57) ABSTRACT

Photo-masks for fabricating surface-relief grating diffractive devices and methods of fabricating surface-relief grating diffractive devices are described. The photo-mask can include refractive elements and/or diffractive elements contained in or on a body element. The photo-mask can be used to simultaneously produce multiple surface-relief grating diffractive devices in a recording material. The photo-mask enables the surface-relief grating diffractive devices to be produced in large quantities while significantly reducing the cost and labor required.

11 Claims, 8 Drawing Sheets

OTHER PUBLICATIONS

Campbell, M. et al., "Fabrication of Photonic Crystals for the Visible Spectrum by Holographic Lithography", Letters to Nature, vol. 404, Mar. 2, 2000, pp. 53-56; 1 pg. Copyright Notice.

Chelnokov, Alexei et al., "Fabrication of 2-D and 3-D Silicon Photonic Crystals by Deep Etching", IEEE Journal of Selected Topics in Quantum Electronics, vol. 8, No. 4, Jul./Aug. 2002, pp. 919-927.

Dolling, Gunnar et al., "Simultaneous Negative Phase and Group Velocity of Light in a Metamaterial", Science, vol. 312, May 12, 2006, pp. 892-894.

Dolling, G. et al., "Negative-Index Metamaterial at 780 nm Wavelength", Optics Letters, vol. 32, No. 1, Jan. 1, 2007, pp. 53-55.

IEEE Journal Published 2006, Klar, Thomas A. et al., "Negative-Index Metamaterials: Going Optical", pp. 1-11.

Knickerbocker, John U. et al., "3-D Silicon Integration and Silicon Packaging Technology Using Silicon Through-Vias", IEEE Journal of Solid-State Circuits, vol. 41, No. 8, Aug. 2006, pp. 1718-1725.

Liu, Zhaowei et al., "Far-Field Optical Hyperlens Magnifying Sub-Diffraction-Limited Objects", Science, vol. 315, Mar. 23, 2007, p. 1686.

Mao, Weidong et al., "Crystallography of Two-Dimensional Photonic Lattices Formed by Holography of Three Noncopolanar Beams", Optical Society of America, vol. 22, No. 5, May 2005, pp. 1085-1091.

Moon, Jun Hyuk et al., "Photonic Band-Gap Structures of Core-Shell Simple Cubic Crystals from Holographic Lithography", Applied Physics Letter, vol. 88, 2006, pp. 121101-1-121101-3: 1 pg. Copyright Notice.

Pang, Lin et al., "Fabrication of Two-Dimensional Photonic Crystals with Controlled Defects by Use of Multiple Exposures and Direct Write", Applied Optics, vol. 42, No. 27, Sep. 20, 2003, pp. 5450-5456.

Ramakrishna, S. Anantha, "Physics of Negative Refractive Index Materials", Institute of Physics Publishing, vol. 68, 2005, pp. 449-521.

Smolyaninov, Igor I. et al., "Magnifying Superlens in the Visible Frequency Range", Science, vol. 315, Mar. 23, 2007, pp. 1699-1701.

Venkataraman, Sriram et al., "Fabrication of Three-Dimensional Photonic Crystals Using Silicon Micromachining", Applied Physics Letters, vol. 85, No. 11, Sep. 13, 2004, pp. 2125-2127: 1 pg. Copyright Notice.

Zhang, Shuang et al., "Near-Infrared Double Negative Metamaterials", Optics Express, vol. 13, No. 13, Jun. 27, 2005, pp. 4922-4930; 1 pg. Copyright Notice.

* cited by examiner

PHOTO-MASKS AND METHODS OF FABRICATING SURFACE-RELIEF GRATING DIFFRACTIVE DEVICES

CROSS-REFERENCE TO RELATED APPLICATION

The present application claims the benefit of U.S. Provisional Patent Application Ser. No. 60/816,278, filed 22 Jun. 2006, and entitled "Phase Masks For Wafer-Scale Fabrication of Surface-Relief Diffractive Couplers," which is hereby incorporated by reference in its entirety as if fully set forth below.

TECHNICAL FIELD

The various embodiments of the present invention relate generally to optical grating diffractive devices (e.g., couplers, feedback devices, sensor devices, and the like), and more particularly, to photo-masks for use in fabricating surface-relief grating diffractive devices, and to methods of making the surface-relief grating diffractive devices.

BACKGROUND

Chip-level communication systems are being stressed due to the ever-increasing demand for greater bandwidths to handle evolving interconnection needs. More and more, interconnection systems are evolving to meet these needs by employing optical signaling systems that employ integrated optics, optical fiber, and specialized optical circuits and components.

The creation of such optical components has become a time consuming and expensive proposition. The optical circuits manufactured today are microscopic in size, where typical optical waveguides feature a cross-section of but a few microns in diameter.

Due to the size of optical waveguides and optical circuitry and other factors, current processes employed in their manufacture can be very costly and labor intensive.

With regard to particular components employed to couple a guided wave from one optical waveguide to a detector or another waveguide, or to couple a light source to a waveguide, this is especially the case. In these couplers, oftentimes a lens is employed to focus the exiting light so as to allow the light to enter a second waveguide without obstruction or loss. Positioning of such a lens is quite labor intensive, as are the subsequent steps of packaging the overall device, translating into a very high cost. This high cost impedes the overall creation of optical communications systems. Consequently, there is a need for systems and methods for producing grating diffractive devices simply, thereby allowing such components to be manufactured at significantly reduced cost with low labor requirements.

It is to the provision of such systems and methods that the various embodiments of the present invention are directed. More specifically, it is to the provision of improved photo-masks for use in fabricating surface-relief grating diffractive devices as well as the methods of making surface-relief grating diffractive devices, that the various embodiments of the present invention are directed.

BRIEF SUMMARY

Various embodiments of the present invention are directed to photo-masks for use in fabricating surface-relief grating diffractive devices. Some embodiments are also directed to apparatuses for, and methods of, making the surface-relief grating diffractive devices. When discussing the various embodiments of the present invention, reference is sometimes made to surface-relief grating diffractive devices, surface-relief gratings, surface-relief diffraction gratings, and the like. It should be noted that these terms are intended to be used interchangeably to generally refer to an optical element having an array of fine slits or grooves on its surface that are used to concentrate light in a specific direction as determined by the period and profile of the slits or grooves and by the wavelength of the light.

Broadly described, a photo-mask according to an embodiment of the present invention can include one or both of refractive elements or diffractive elements contained in a substrate or body element of the photo-mask. The diffractive elements can include one or more volume gratings or surface-relief gratings. The refractive elements can include one or more materials having a different index of refraction than the body element. The photo-mask can be used to simultaneously produce multiple surface-relief gratings on a recording material, such as a wafer material. The photo-masks enable the surface-relief couplers to be produced in large quantities while significantly reducing the cost and labor required.

An apparatus for producing a surface-relief grating diffractive device according to an embodiment of the present invention can include a photo-mask and a recording material. The one or both of the diffractive elements and/or the refractive elements of the photo-mask that are disposed on a body element or within the body element diffract and/or refract light to interferometrically produce the surface-relief grating diffractive device in the recording material.

Another apparatus for producing a surface-relief grating diffractive device can include a photo-mask that has a patterned layer disposed on a face of the body element. The patterned layer can include transparent portions and opaque portions. The one or both of the diffractive elements and/or the refractive elements of the photo-mask that are disposed on the body element or within the body element diffract and/or refract light and transmit the light through the photo-mask to produce the surface-relief grating diffractive device in the recording material. The surface relief grating diffractive devices can include a pattern that resembles the transparent portions of the patterned layer.

A method for creating a surface-relief grating diffractive device according to an embodiment of the present invention can include generating a light beam that can be directed into a photo-mask. The one or both of diffractive elements or refractive elements of the photo-mask can be configured to optically couple a pair of light beams to at least a portion of a recording material over which the photo-mask is aligned. The pair of light beams can be focused to create an interference pattern in the recording material to form the surface-relief grating diffractive device.

Another method for creating a surface-relief grating diffractive device can include generating a light beam that can be directed into a photo-mask that has a patterned layer disposed on a face of the body element. The patterned layer can include transparent portions and opaque portions. The photo-mask can be aligned on at least a portion of a recording material. The one or both of diffractive elements or refractive elements of the photo-mask can be configured to diffract and/or refract the light beam through a transparent portion of the patterned layer. The light emitted through the transparent portion of the patterned layer can be focused to form the surface-relief grating diffractive device. The surface relief grating diffractive devices can include a pattern that resembles the transparent portions of the patterned layer.

If simultaneous production of multiple surface-relief gratings on a recording material is not desired, the methods can be repeated to produce multiple surface-relief gratings on a recording material by aligning the photo-mask over a second portion of the recording material and repeating the methods on the second portion of the recording material.

Using these photo-masks, apparatuses, and methods, surface-relief grating diffractive devices having one or more of rectangular unslanted grooves, parallel-face slanted grooves, right-angle-faced slanted grooves, trapezoidal-profiled unslanted grooves, trapezoidal-profiled slanted grooves, unslanted rounded or curved grooves, or slanted rounded or curved grooves, can be produced. For example, a surface relief grating diffractive device having parallel-face slanted grooves can be produced to have a ridge of one groove at least partially covering a ridge of a neighboring groove and a slant angle that substantially satisfies a first Bragg condition.

Other aspects and features of embodiments of the present invention will become apparent to those of ordinary skill in the art, upon reviewing the following detailed description in conjunction with the accompanying figures.

BRIEF DESCRIPTION OF THE DRAWINGS

The various embodiments of the invention can be better understood with reference to the following drawings. The components in the drawings are not necessarily to scale, emphasis instead being placed upon clearly illustrating the principles of the various embodiments of the present invention. In the drawings, like reference numerals designate corresponding parts throughout the several views.

DETAILED DESCRIPTION

Figure 1:
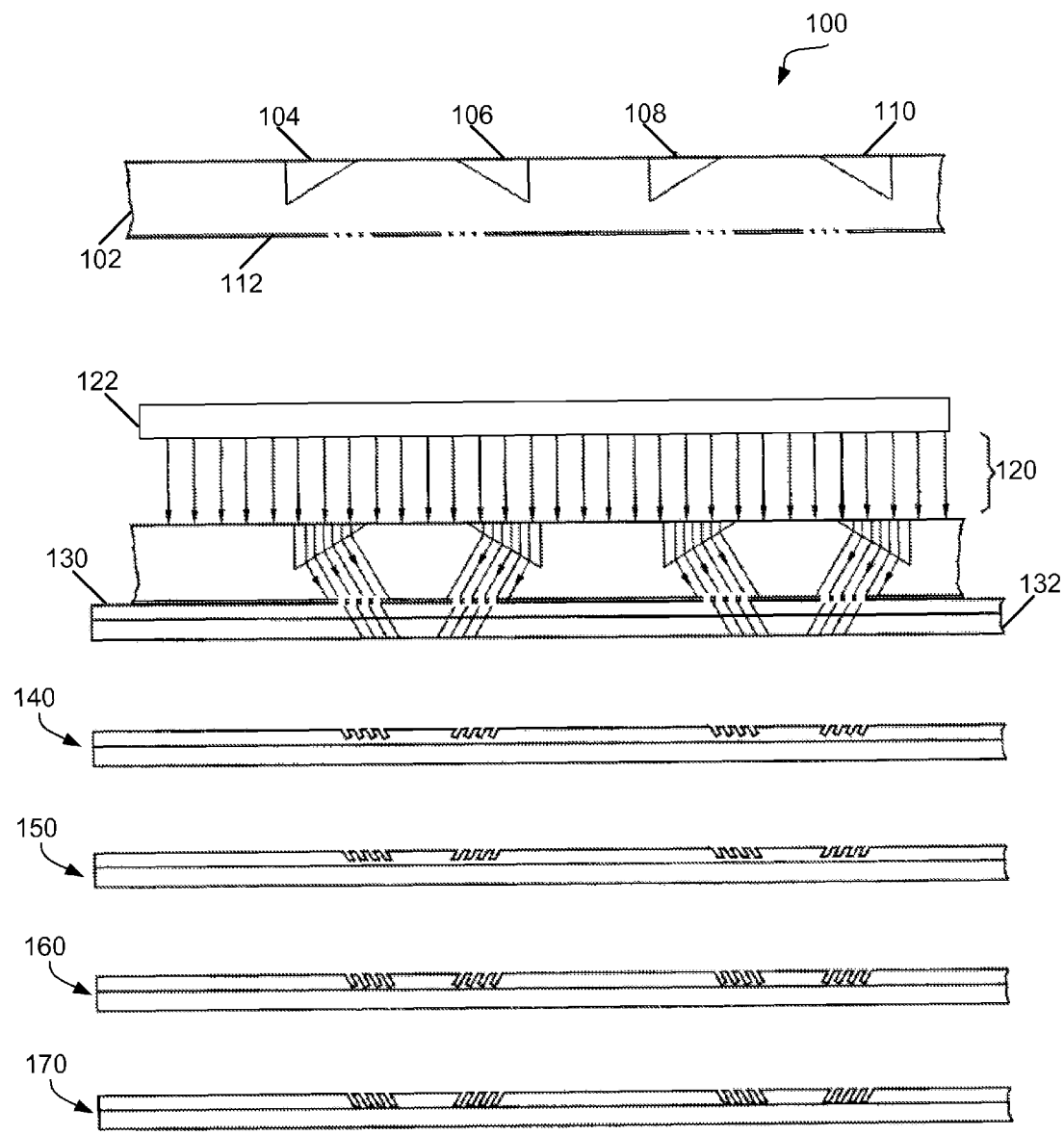
FIG. 1 schematically illustrates a transparent-opaque-type photo-mask in its operating environment according to some embodiments of the present invention.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. The terms "a", "an", and "the" do not denote a limitation of quantity, but rather denote the presence of "at least one" of the referenced item. Further, the contents of all patents, patent application publications, journal publications, and the like, are expressly incorporated herein in their entireties as if fully set forth below.

Surface-relief gratings are of great interest in many applications. The fabrication technique chosen to create the surface-relief grating, however, can severely affect the range of characteristics (e.g., slant angles, groove depths, and the like) that can be realized. The various embodiments of the present invention provide improved photo-masks for use in fabricating surface-relief gratings, methods of making the surface-relief gratings, as well as systems or apparatuses for producing the surface-relief gratings. The photo-masks generally include a substrate or body component with one or both of diffractive elements or refractive elements included therein. Using these photo-masks, coupled with the availability of new and improved fabrication techniques, some of the more challenging (i.e., having characteristics that were heretofore difficult to produce) surface-relief gratings can now be fabricated. For example, surface-relief grating diffractive devices having rectangular unslanted grooves, parallel-face slanted grooves, right-angle-faced slanted grooves, trapezoidal-profiled unslanted grooves, trapezoidal-profiled slanted grooves, straight-lined grooves, rounded or curved grooves, or the like can be produced.

The photo-masks are produced by creating a plurality of diffractive elements and/or refractive elements in a body element or substrate. For example, the methods disclosed in commonly-assigned U.S. Pat. Nos. 6,285,813 and 6,606,432 can be used to produce diffractive elements, such as volume gratings, in the photo-mask. For example, one method in U.S. Pat. No. 6,285,813 teaches splitting a coherent light beam into a first coherent light beam and a second light beam. The first coherent light beam is directed into a first lens and onto an optical component, such as a prism. The second coherent light beam is directed into a second lens and onto the optical component. The optical component optically transmits the first and second coherent light beams into a recording material to create a diffractive grating. Further, U.S. Pat. No. 6,606,432 provides a method for producing multiple diffraction gratings in a single recording material, which can serve as a phase mask. In contrast, to produce refractive elements in the photo-mask, additional components having different indices of refraction from the primary component of the photo-mask (e.g., air, polymers, glass, and the like) can be incorporated into various regions of the photo-mask. These refractive elements can be used to alter the direction of the light exiting the photo-mask.

Generally speaking, the photo-masks can manipulate light to produce interference patterns on the recording material, such that the characteristics of the surface-relief gratings are determined by the interference patterns themselves. Instead of the interferometric-type photo-masks just described, the photo-mask can be patterned to include various transparent and opaque regions such that light is exposed through the various transparent portions of the photo-mask onto the recording material. With such transparent-opaque-type photo-masks, the characteristics of the surface-relief gratings are determined by the design or pattern of the patterned layer.

FIG. 1 is an illustration of an exemplary embodiment of a transparent-opaque-type photo-mask in its operating environment. In this embodiment, the photo-mask may be used to simultaneously create a plurality of surface-relief gratings that can be used as optical grating diffractive devices. FIG. 1 shows a photo-mask 100 comprising a body element or substrate 102 and a plurality of refractive elements 104, 106, 108, and 110. The plurality of refractive elements 104, 106, 108, and 110 have specific characteristics to angularly deviate or refract the path of light 120 emitted from a light source 122 to a predetermined focus region on a recording material 130 disposed on a second substrate 132. The focus region may be a point, a line, a spot, or a multidimensional region, including a plane. Preferably, the light 120 emitted from the light source 122 is coherent light, such as laser light, or collimated ultraviolet light.

The plurality of refractive elements 104, 106, 108, and 110 can be formed from materials that have different indices of refraction from the composition used to form the body element 102 of the photo-mask 100. For example, the material used to make the plurality of refractive elements can include air (e.g., by creation of a void in the body element 102), a polymer, a glass, or the like. The plurality of refractive elements 104, 106, 108, and 110 can be produced using techniques such as chemical etching, dry etching (e.g., reactive ion etching), ion milling, ultraviolet lithography, visible-wavelength lithography, impurity diffusion, ion implantation, laser irradiation, and the like.

The transparent-opaque-type photo-mask 100 also includes a patterned layer 112, such as a chrome layer, that includes various transparent and opaque regions. Only the angularly deviated light 120 that passes through the transparent portions of the patterned layer 112 can be exposed to the recording material 130, which is coated on a different substrate 132. That is, the pattern created by the transparent portions of the patterned layer 112 determines the focus regions on the recording material 130.

As shown in FIG. 1, depending on the exposure and processing conditions, surface-relief gratings 140, 150, 160, 170 having different characteristics can be created.

Figure 2:
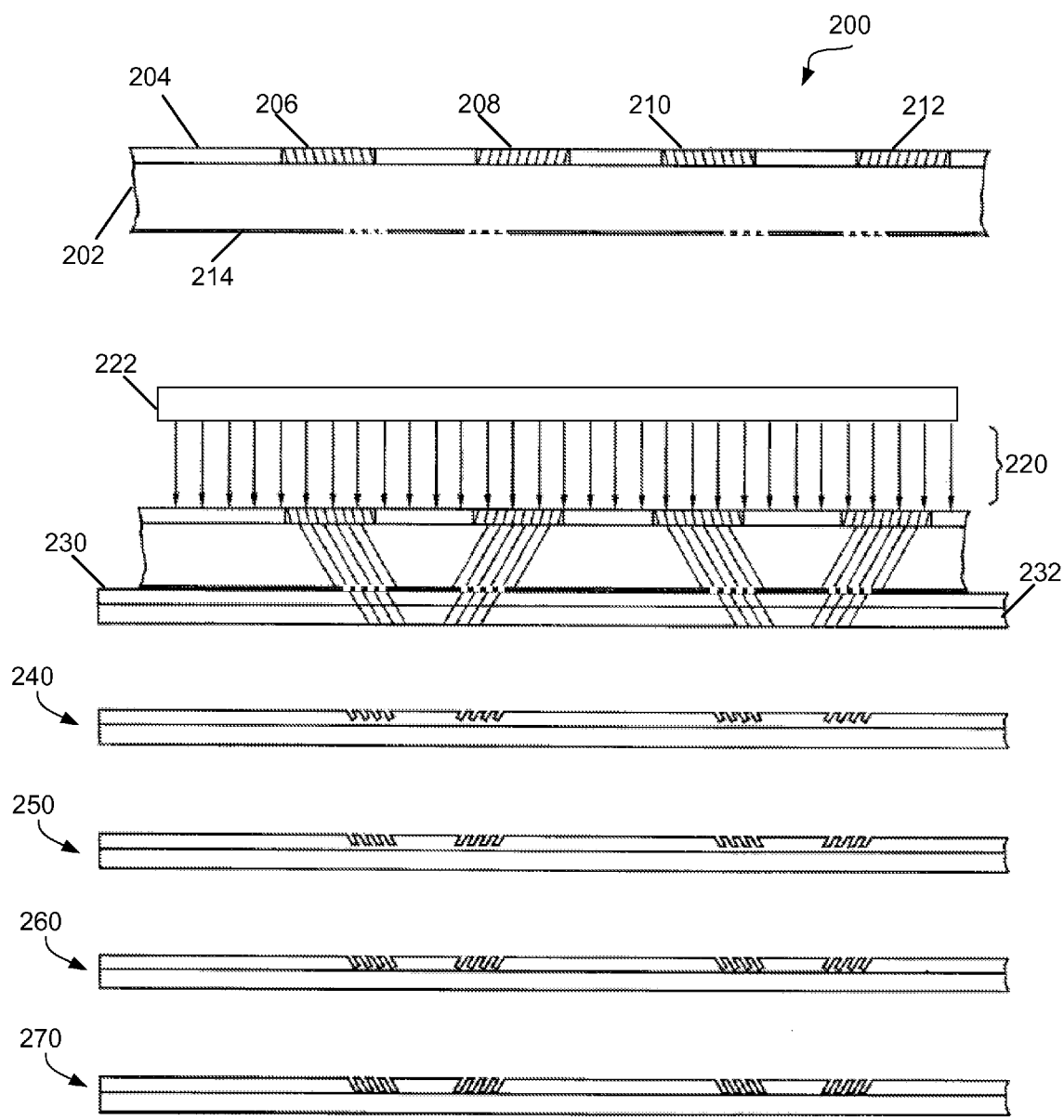
FIG. 2 schematically illustrates a transparent-opaque-type photo-mask in its operating environment according to other embodiments of the present invention.

FIG. 2 is an illustration of another exemplary embodiment of a transparent-opaque-type photo-mask in its operating environment in its operating environment. In this embodiment as well, the photo-mask may be used to simultaneously create a plurality of surface-relief gratings that can be used as optical grating diffractive devices. FIG. 2 shows a photo-mask 200 comprising a body element or substrate 202 and a diffractive layer 204 comprising a plurality of diffractive elements 206, 208, 210, and 212. The plurality of diffractive elements 206, 208, 210, and 212 have specific characteristics to diffract light 220 emitted from a light source 222 to a predetermined focus region on a recording material 230 disposed on a different substrate 232. The focus region may be a point, a line, a diffraction limited spot, or a multidimensional region, including a plane. Preferably, the light 220 emitted from the light source 222 is coherent light, such as laser light, or collimated ultraviolet light.

The plurality of diffractive elements 206, 208, 210, and 212 can include volume gratings, surface-relief gratings, or the like. Methods for designing diffractive elements with predetermined characteristics are described in commonly-assigned U.S. Pat. Nos. 6,285,813 and 6,606,432, which are hereby incorporated by reference in their entireties.

The transparent-opaque-type photo-mask 200 also includes a patterned layer 214, such as a chrome layer, that includes various transparent and opaque regions. Only the diffracted light 220 that passes through the transparent portions of the patterned layer 214 can be exposed to the recording material 230. That is, the pattern created by the transparent portions of the patterned layer 212 determines the focus regions on the recording material 230.

Just as with the photo-mask 100 of FIG. 1, depending on the exposure and processing conditions, the photo-mask 200 of FIG. 2 can create different surface-relief gratings 240, 250, 260, 270.

Figure 3:
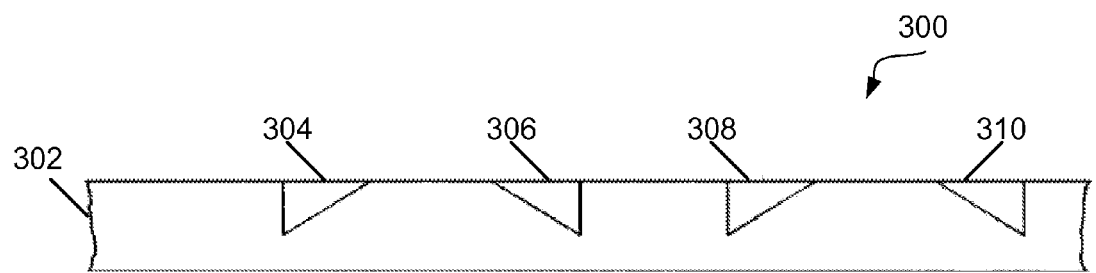
FIG. 3 schematically illustrates an interferometric-type photo-mask in its operating environment according to some embodiments of the present invention.
Figure 4:
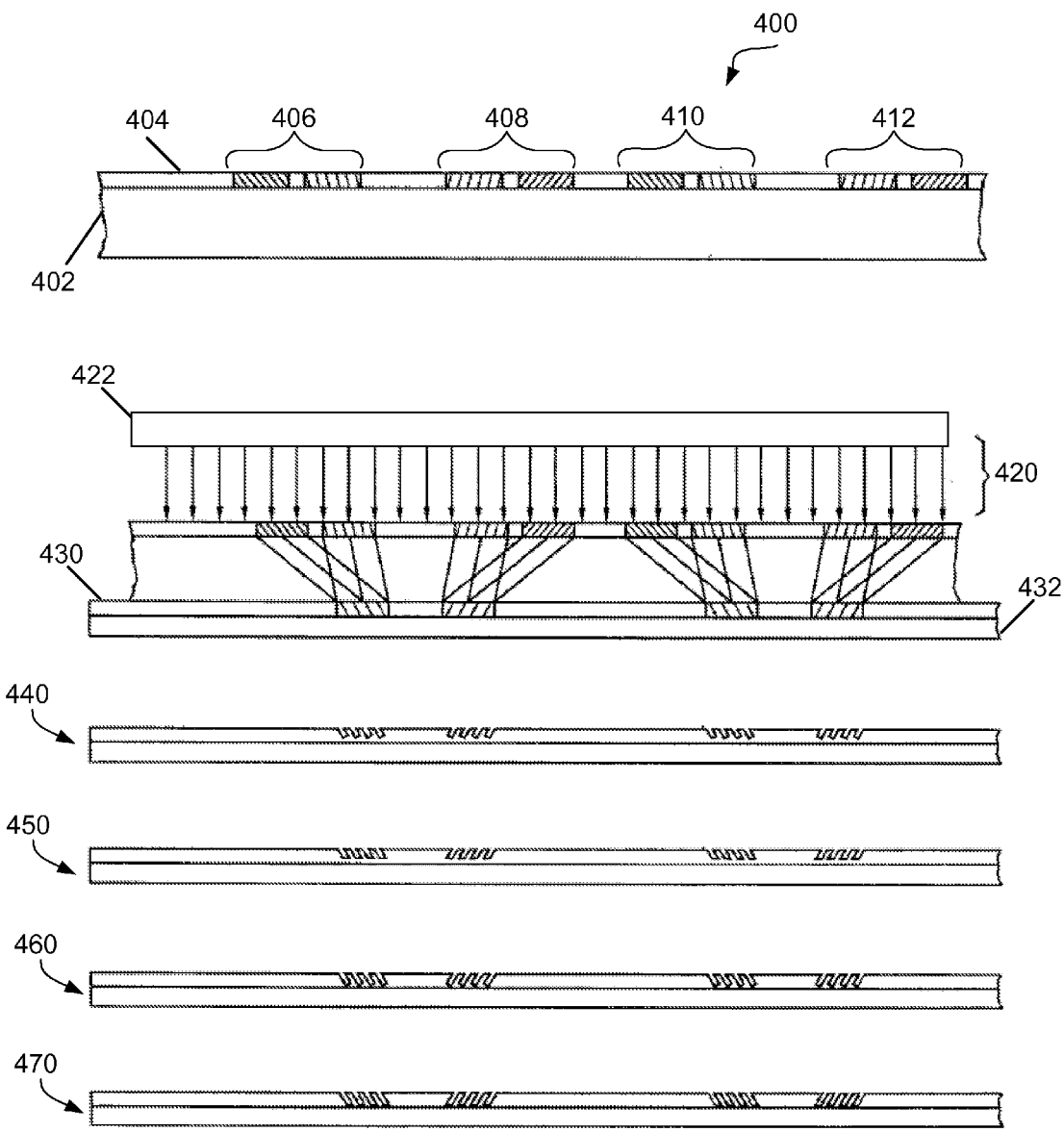
FIG. 4 schematically illustrates an interferometric-type photo-mask in its operating environment according to other embodiments of the present invention.

FIGS. 3 and 4 are illustrations of exemplary embodiments of interferometric-type photo-mask in their operating environments. These photo-masks also can be used to simultaneously create a plurality of surface-relief gratings that can be used as optical grating diffractive devices. The photo-mask 300 of FIG. 3 is analogous to the photo-mask 100 of FIG. 1, with the exception that no patterned layer 112 exists. Similarly, the photo-mask 400 of FIG. 4 is analogous to the photo-mask 200 of FIG. 2, with the same exception (i.e., that no patterned layer 214 exists). An additional difference between the photo-mask 400 of FIG. 4 and the photo-mask 200 of FIG. 2 includes the use of pairs of diffractive elements instead of single elements. However, the plurality of pairs of diffractive elements 406, 408, 410, and 412 can be similarly fabricated, as described in commonly-assigned U.S. Pat. No. 6,606,432.

The primary difference between photo-masks 300, 400 and 100, 200 is that instead of relying upon the transparent portions of the patterned layer to determine the focus regions on the recording materials, the plurality of refractive elements 304, 306, 308, and 310 of photo-mask 300 and the plurality of pairs of diffractive elements 406, 408, 410, and 412 of photo-mask 400 generate interference patterns on the recording material 330 and 430, respectively, that create the surface-relief gratings. However, like photo-masks 100 and 200, photo-masks 300 and 400 can also be used to create surface-relief gratings having different characteristics based on exposure and processing conditions.

It is important to note that for both interferometric-type photo-masks as well as transparent-opaque-type photo-masks a combination of diffractive elements and refractive elements can be used. That is, the various embodiments of the photo-masks are not limited to having only diffractive elements or only refractive elements.

In exemplary embodiments, the substrates or body elements can be formed from a glass such as fused silica, borosilicate crown glass (e.g., BK-7), or other similar glasses. Alternatively, the substrates or body elements can be formed from any material suitable for use in a photo-mask, such as a photosensitive material (e.g., photorefractive crystals, organic volume phase holographic materials, or the like). In exemplary embodiments, the recording materials are photosensitive compositions such as those listed immediately above.

Figure 5:
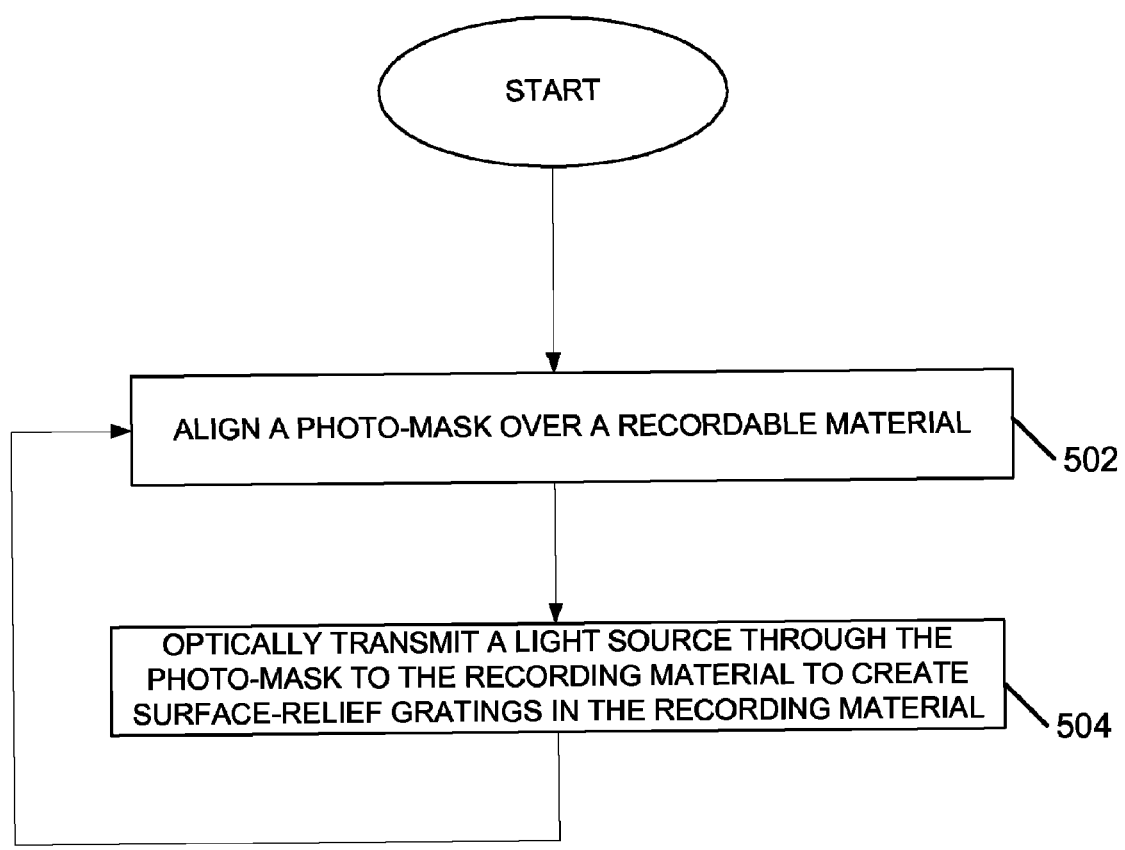
FIG. 5 is a process flow diagram illustrating an exemplary implementation of a method for making a plurality of surface-relief grating diffractive devices using a photo-mask.

FIG. 5 is a flow diagram illustrating an exemplary implementation of a method for making a plurality of surface-relief gratings using a photo-mask. To create the surface-relief gratings, the photo-mask is aligned over the recording material 502 on which the surface-relief gratings are to be created. Once the photo-mask is aligned over the recording material, light produced by a light source is optically transmitted through the photo mask to the recording material to create the surface-relief gratings in the recording material 504. Using this method, a plurality of surface-relief gratings may be created substantially simultaneously as the light is coupled to the recording material.

Figure 6:
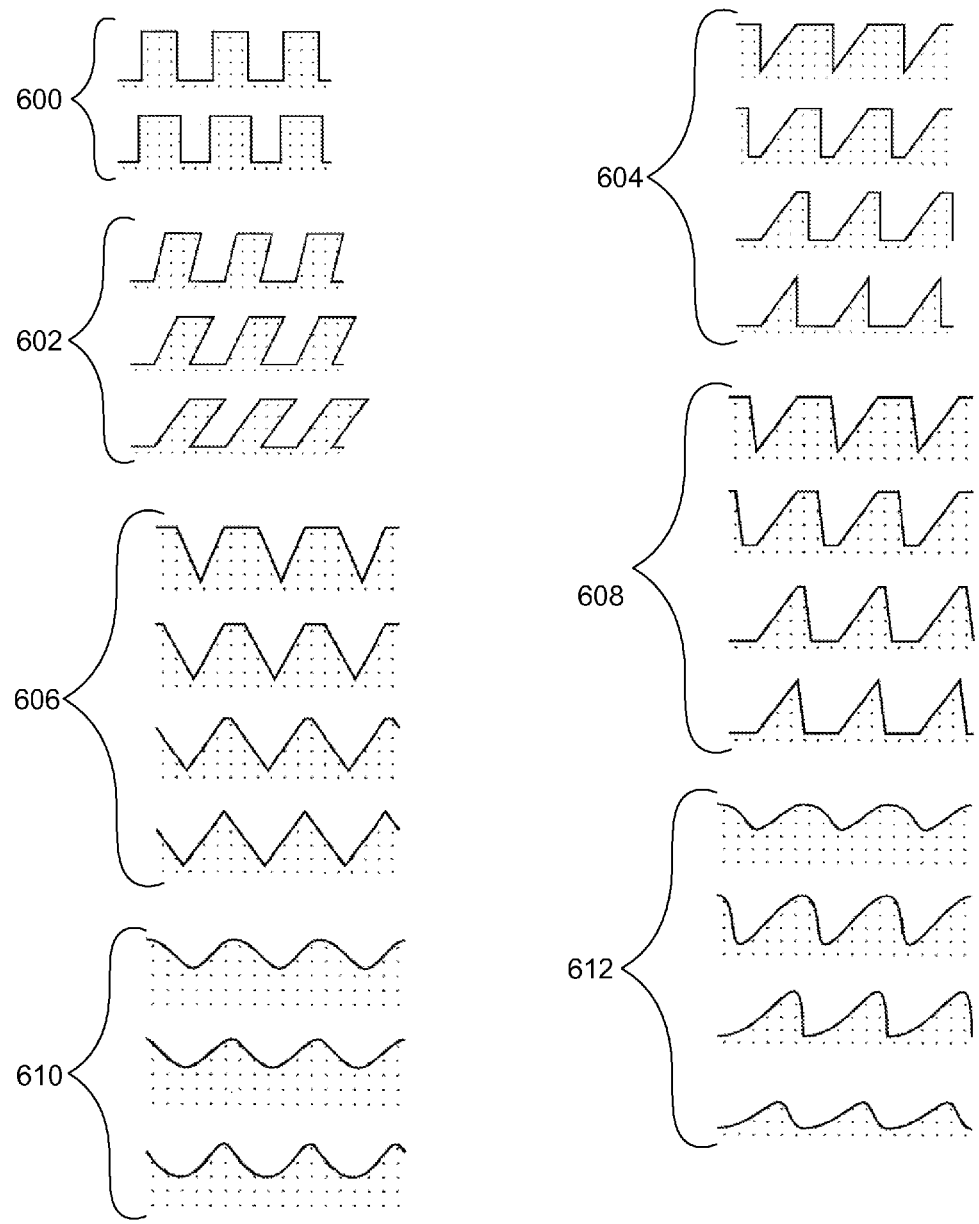
FIG. 6 schematically illustrates exemplary groove geometries for surface-relief grating diffractive devices according to some embodiments of the present invention.

Using the photo-masks disclosed herein, surface-relief gratings having different characteristics can be fabricated. In particular, the photo-masks, coupled with techniques such as energetic neutral atom beam lithography/epitaxy (ENABLE), nanolithography, electron beam lithography, and the like, enable the formation of surface-relief gratings with difficult-to-produce geometries. Some of the general shapes of the grooves or slits that can be formed using the photo-masks described herein are shown in FIG. 6. These include surface-relief gratings having rectangular unslanted grooves 600, parallel-face slanted grooves 602, right-angle-faced slanted grooves 604, trapezoidal-profiled unslanted grooves 606, trapezoidal-profiled slanted grooves 608, unslanted rounded or curved grooves 610, and slanted rounded or curved grooves 612.

Preferably, the surface-relief gratings are created on a recording material that is coated on a substrate, such as a microelectronic integrated circuit, printed wiring board, or the like. In exemplary embodiments, they are created on semiconductor materials (e.g., silicon, gallium arsenide, and the like) or on dielectric materials (e.g., photodefinable polymers such as azobenzene). In this manner, the method of FIG. 5 can be used to produce circuit boards containing many surface-relief gratings that can be used as optical grating diffractive devices to couple light from a waveguide into a microelectronic integrated circuit.

Advantageously, the surface-relief grating diffractive devices can be used for in-plane and/or out-of-plane coupling applications, light-focusing applications, beam-splitting applications, applications requiring wavelength-division multiplexing of many channels into one optical interconnect, and the like. These applications are possible because the surface-relief gratings fabricated using the disclosed photo-masks exhibit one or more of the following advantages: they are compatible with semiconductor, dielectric, or metallic substrates; they have low sensitivity to angular and spatial mispositioning; they are compatible with batch fabrication, they exhibit high diffraction efficiencies and index of refraction changes within the gratings; they are compatible with free space interconnects or optical waveguides; or the like.

The present invention is exemplified by the following non-limiting examples.

EXAMPLES

In this example, a combination of rigorous coupled wave analysis (RCWA) and simulated annealing (SA) were used to determine optimized parallel-face slanted surface-relief gratings (PFSSRGs) in a polymer and in silicon.

Figure 7:
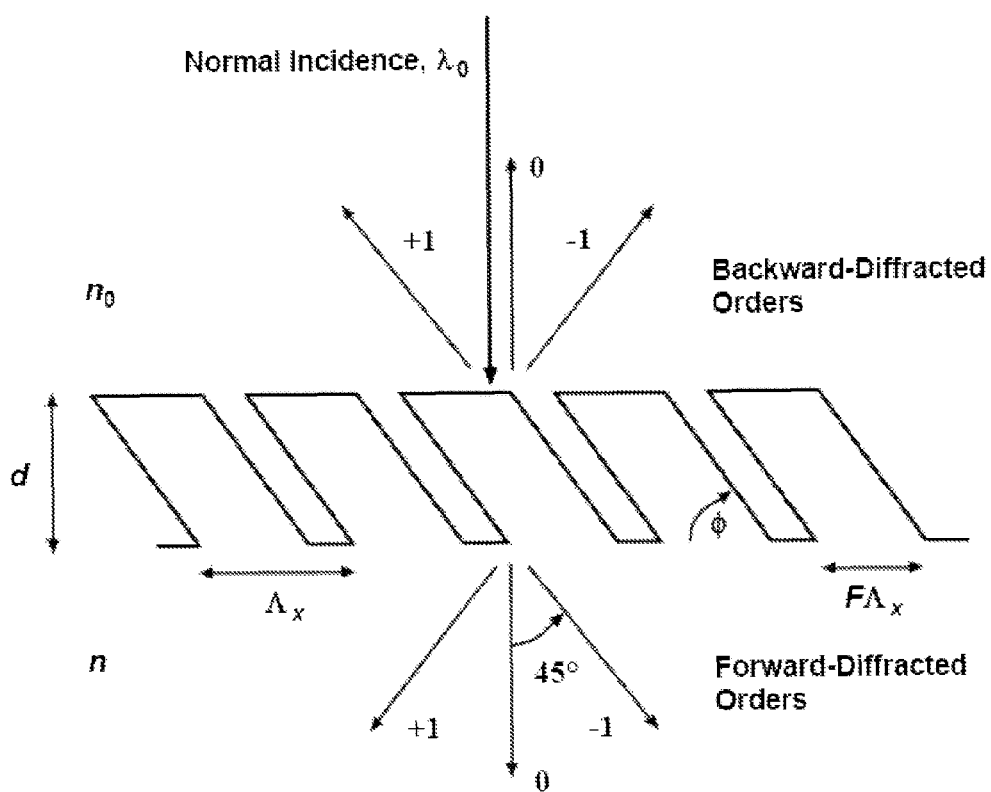
FIG. 7 illustrates a parallel-face slanted surface-relief grating diffractive device illuminated by normally incident light, characterized by a grating period $\Lambda_x$ (which is determined by choosing an output angle of 45° for the −1 diffracted order), groove depth d, slant angle $\phi$, and filling factor F.

The design technique involved a coarse mapping simulation, followed by localized investigation with an SA algorithm, both steps using RCWA. For PFSSRGs, the variable parameters included the filling factor (equal at the top and bottom of the groove) F, slant angle $\phi$, and groove depth d, which defined a three-dimensional simulation space. Optimization was performed for polymer and silicon cases and both transverse electrical (TE) and transverse magnetic (TM) polarizations at normal incidence in air with an output angle of 45° for the first diffracted order (−1). The simulated configuration is shown in FIG. 7. For completeness, filling factors ranging from 0.01 to 0.99 and slant angles ranging from 1° to 89° were included. An upper limit of 3 micrometers was used for both the silicon and polymer cases, which was about $2\lambda_0$ for the silicon case and $3\lambda_0$ for the polymer case. The substrate's refractive index is n and the input region index is $n_0$ (air, in this case). All simulations were performed on 2GHz single-processor personal computers with 1 GB of RAM.

For the polymer case, the index was 1.5, along with an incident wavelength of $\lambda_0=0.85$ µm. To achieve the desired output angle, a grating period of $\Lambda_x=\lambda/n\sin 45°=0.8014$ µm, was used. The generated mappings for the TE and TM cases included 13 (TE) and 11 (TM) regions with diffraction efficiencies greater than 94.7% for TE and 96.4% for TM in the −1 forward diffracted order. Overall simulation time was approximately a week on a personal computer for each case using 80 sub-layers, 7 diffracted orders, and 20 coefficients for the harmonic expansion of the refractive index. To reduce the simulation time for deeper gratings in the simulation space, a fixed number of sub-gratings was used which can portray accurately profiles of greater depth. Limiting the depth bound and fixing the number of sub-layers to a fraction of the wavelength of interest was an alternative means that in some cases reduced simulation time while maintaining accuracy.

After identifying the high efficiency regions, a simulated annealing algorithm was used to find each local optimum. The same parameters for sub-layers, diffracted orders, and number of harmonics were used. The optimized gratings were ordered by increasing groove depth. Every local optimum recorded had very high efficiency, with the lowest being 96.90% in the TE case and 97.36% in the TM case. The simulation times varied from less than one day to as long as a week. The highest simulation times were for the least feasible cases (i.e., those with the shallowest slant angles and greatest depths). While the identified diffraction efficiencies for both polarizations were similar, the TM profiles were, in general, greater in depth.

Figure 8:
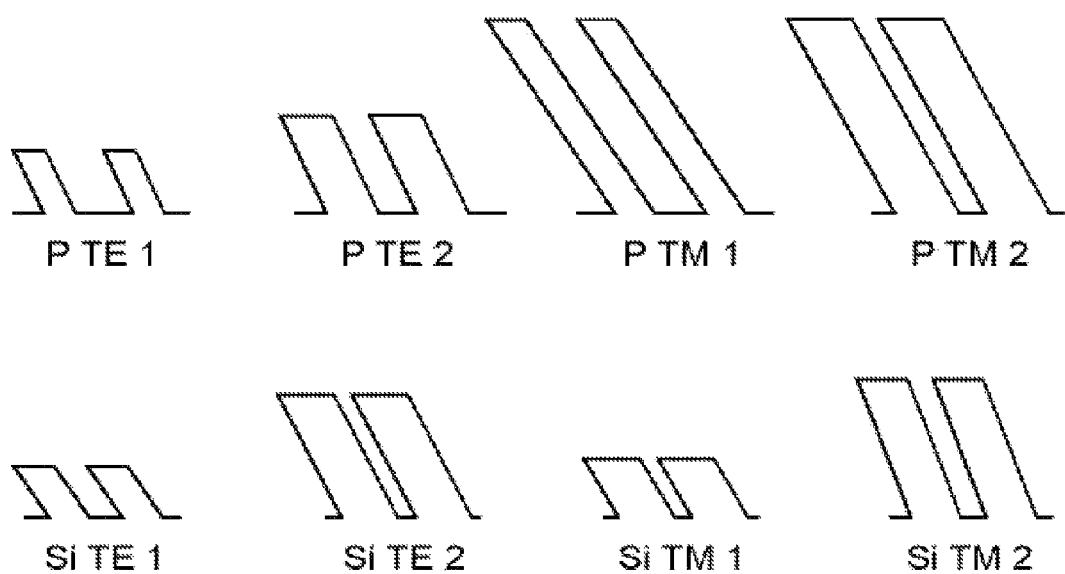
FIG. 8 illustrates four optimized geometry profiles for a polymer (top) and four for silicon (bottom), with two optimized geometry profiles for each material corresponding to transverse electric polarizations and two corresponding to transverse magnetic polarizations.

From the located optima, four cases were chosen that demonstrate the high efficiency with reasonable feasibility for fabrication—two cases each for TE and TM. These four geometries for the polymer (two each for TE and TM) are shown in the top half of FIG. 8. The principal feature determining feasibility was the groove depth in relation to the slant angle. The profiles deemed most feasible were those where one ridge would least cover the next ridge and minimize any problems associated with slanted etching. The optimized diffraction efficiencies were 98.10%, 97.54%, 98.83%, and 98.04% for these gratings.

It should be noted that for both TE and TM, the practical case with shallower groove depth had slightly higher diffraction efficiency. The slant angle for which the first Bragg condition would be satisfied, $\phi_{Br,-1}$, was estimated for each grating case. The average effective index for each polarization was calculated using the effective media formulation of Rytov for a periodic structure at long wavelengths with a given filling factor. These estimated slant angles were near the optimized-profile slant angles in most cases. In fact, all of the profiles chosen for their fabrication feasibility exhibited slant angles near those that are estimated to satisfy the first Bragg condition. Sensitivity analysis was also performed for the variable parameters (d, F, and $\phi$) to determine fabrication tolerances and the incident angle to determine alignment tolerance. Smoothly varying curves were obtained, and indicated modest changes in diffraction efficiency of typically a few percent, with the greatest changes due to variation of the slant angle, which showed a maximum change of slightly greater than 12%. For the incident angle, analysis was performed over the entire possible range. The loss in diffraction efficiency was modest for misalignment of less than a couple degrees, but significant for anything greater.

For the silicon case, n=3.475, $\lambda_0=1.55$ µm, and $\Lambda_x=0.6308$ µm. The generated mappings for the TE and TM cases resulted in 5 high efficiency regions for each case. The simulation parameters were identical to those for the polymer case. These gratings were more appropriate for TM polarization as they demonstrated much higher efficiencies than for TE polarization. Efficiencies for TE ranged from 70.23% to 83.51% while TM efficiencies ranged from 82.45% to 99.63%. For each case, 2 feasibly fabricated optima were identified. These four geometries for silicon (two each for TE and TM) are shown in the bottom half of FIG. 8. The optimized efficiencies were 79.65%, 78.12%, 82.44%, and 92.07% for these gratings.

While for TE the shallower practical case had higher diffraction efficiency similar to the polymer case, for TM it was the opposite and the difference was a significant 10%. Again, most of the optimized profiles exhibited slant angles near those that were estimated to satisfy the first Bragg condition. These first Bragg slant angles were determined in the same manner as those for the polymer case. As with the polymer case, all of the profiles chosen for their feasible fabrication had slant angles near those that were estimated to satisfy the first Bragg condition. Sensitivity analysis was performed in a fashion similar to that for the polymer case. The silicon gratings were more tolerant to misalignment than the polymer gratings, but exhibited higher sensitivity to changes in depth, filling factor, and slant angle. The only extreme sensitivity was to filling factor for the TM profiles, with the diffraction efficiency dropping almost 60% with 5% variation. Simulation times were similar to those for the polymer case.

Thus, in this example, parallel-face slanted surface-relief gratings (PFSSRGs) were optimized using a combination of rigorous coupled wave analysis (RCWA) and simulated annealing (SA). For substrate-mode optical interconnects, profiles were presented for both polymer and silicon PFSSRGs for both TE and TM polarizations at normal incidence with grating periods designed to give a 45° output angle in the −1 forward-diffracted order. The resulting diffraction efficiencies ranged from 70% to 99%, with a majority of the optimized profiles yielding over 90%. Optimized polymer profiles for TE and TM polarizations exhibited similar high diffraction efficiencies, but the TM profiles generally required greater groove depths. Silicon profiles optimized for TM polarization had greater diffraction efficiencies than those for TE polarization. Profiles that could feasibly be fabricated were identified and sensitivities to groove depth, filling factor, slant angle, and incident angle were modest.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof. For example, temperature and pressure parameters may vary depending on the particular materials used.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the present invention should not be limited to the above discussed embodiments, and should only be defined by the following claims and all equivalents.

What is claimed is:

1. An apparatus for producing a surface-relief grating diffractive device, comprising:
    a photo-mask comprising one or both of diffractive elements or refractive elements, wherein the diffractive elements and/or the refractive elements are disposed on a body element or within the body element and wherein each diffractive element and/or refractive element produces substantially unidirectional light, and a patterned layer disposed on a face of the body element comprising transparent portions and opaque portions; and
    a recording material;
    wherein substantially unidirectional light diffracted and/or refracted by the diffractive elements and/or refractive elements and transmitted through the photo-mask non-interferometrically produce a surface-relief grating diffractive device in the recording material.

2. The apparatus of claim 1, wherein the surface relief grating diffractive device comprises a pattern corresponding to the transparent portions of the patterned layer.

3. The apparatus of claim 1, wherein the surface-relief grating diffractive device comprises one or more of rectangular unslanted grooves, parallel-face slanted grooves, right-angle-faced slanted grooves, trapezoidal-profiled unslanted grooves, trapezoidal-profiled slanted grooves, unslanted rounded or curved grooves, or slanted rounded or curved grooves.

4. The apparatus of claim 1, wherein the surface relief grating diffractive device comprises parallel-face slanted grooves, wherein a ridge of one groove at least partially covers a ridge of a neighboring groove and a slant angle substantially satisfies a first Bragg condition.

5. The apparatus of claim 1, wherein the diffractive elements comprise one or more volume gratings or surface-relief gratings.

6. The apparatus of claim 1, wherein the refractive elements comprise one or more materials having a different index of refraction than the body element.

7. A method for creating a surface-relief grating diffractive device, the method comprising:
    generating a light beam;
    directing the light beam into a photo-mask having one or both of diffractive elements or refractive elements, wherein each diffractive element and/or refractive element produces substantially unidirectional light and wherein the diffractive elements and/or the refractive elements are configured to diffract and/or refract the substantially unidirectional light beam through a transparent portion of a patterned layer disposed on a face of the photo-mask; and
    focusing light emitted through the transparent portion of the photo-mask on at least a portion of a recording material over which the photo-mask is aligned to non-interferometrically form the surface-relief grating diffractive device.

8. The method of claim 7, wherein the surface relief grating diffractive device comprises a pattern corresponding to the transparent portions of the patterned layer.

9. The method of claim 7, wherein the surface-relief grating diffractive device comprises one or more of rectangular unslanted grooves, parallel-face slanted grooves, right-angle-faced slanted grooves, trapezoidal-profiled unslanted grooves, trapezoidal-profiled slanted grooves, unslanted rounded or curved grooves, or slanted rounded or curved grooves.

10. The method of claim 7, wherein the surface relief grating diffractive device comprises parallel-face slanted grooves, wherein a ridge of one groove at least partially covers a ridge of a neighboring groove and a slant angle substantially satisfies a first Bragg condition.

11. The method of claim 7, further comprising aligning the photo-mask over a second portion of the recording material and repeating the generating, directing, and focusing on the second portion of the recording material.

* * * * *